(12) United States Patent
Robert et al.

(10) Patent No.: US 9,538,179 B2
(45) Date of Patent: Jan. 3, 2017

(54) METHOD AND APPARATUS FOR PROCESSING OCCLUSIONS IN MOTION ESTIMATION

(71) Applicant: Thomson Licensing, Issy de Moulineaux (FR)

(72) Inventors: Philippe Robert, Cesson Sevigne (FR); Matthieu Fradet, Cesson Sevigne (FR); Pierre-Henri Conze, Cesson Sevigne (FR)

(73) Assignee: THOMSON LICENSING, Issy de Moulineaux (FR)

( * ) Notice: Subject to any disclaimer, the term of this patent is extended or adjusted under 35 U.S.C. 154(b) by 814 days.

(21) Appl. No.: 13/687,338

(22) Filed: Nov. 28, 2012

(65) Prior Publication Data

US 2013/0148730 A1 Jun. 13, 2013

(30) Foreign Application Priority Data

Dec. 7, 2011 (EP) .................................... 11306621

(51) Int. Cl.
*H04B 1/00* (2006.01)
*H04N 19/553* (2014.01)
*G06T 7/20* (2006.01)
*H04N 5/14* (2006.01)

(52) U.S. Cl.
CPC ....... *H04N 19/00648* (2013.01); *G06T 7/2053* (2013.01); *H04N 5/145* (2013.01); *H04N 19/553* (2014.11)

(58) Field of Classification Search
CPC ............ H04N 19/553; H04N 21/44008; G06T 7/0071; G08B 13/19608
USPC ...................................................... 375/240.15
See application file for complete search history.

(56) References Cited

U.S. PATENT DOCUMENTS

| | | | |
|---|---|---|---|
| 5,394,196 A | 2/1995 | Robert | |
| 7,277,558 B2 | 10/2007 | Sefcik | |
| 2006/0222077 A1 | 10/2006 | Ohwaki et al. | |
| 2007/0211800 A1* | 9/2007 | Shi | H04N 5/145 375/240.16 |
| 2008/0317127 A1* | 12/2008 | Lee | H04N 19/61 375/240.16 |
| 2011/0007982 A1 | 1/2011 | Su et al. | |

(Continued)

FOREIGN PATENT DOCUMENTS

| | | |
|---|---|---|
| EP | 2334065 | 6/2011 |
| WO | WO2011060579 | 5/2011 |

OTHER PUBLICATIONS

The European Search Report dated Mar. 15, 2012.

*Primary Examiner* — Tat Chio
*Assistant Examiner* — Masum Billah
(74) *Attorney, Agent, or Firm* — Tutunjian & Bitetto, P.C.

(57) ABSTRACT

A method and an apparatus for processing occlusions in motion estimation are described. For processing an occlusion in a forward motion field of a second frame relative to a first frame the forward motion field of the second frame relative to the first frame is determined with a motion estimator. Then an area in the second frame that is occluded in the first frame is identified with an occlusion identifier. Finally, a motion corrector determines a corrected forward motion field by filling the forward motion field in the identified area in the second frame using motion vectors of a previous backward motion field of the second frame relative to a previous third frame.

17 Claims, 5 Drawing Sheets

(56) References Cited

U.S. PATENT DOCUMENTS

2011/0211125 A1\* 9/2011 Petrides ............... H04N 19/105
348/616
2013/0106837 A1\* 5/2013 Mukherjee ......... H04N 13/0018
345/419

\* cited by examiner

METHOD AND APPARATUS FOR PROCESSING OCCLUSIONS IN MOTION ESTIMATION

This application claims the benefit, under 35 U.S.C. §119 of EP Patent Application 11306621.1, filed 7 Dec. 2011.

FIELD OF THE INVENTION

The invention relates to a method and an apparatus for processing occlusions in motion estimation, i.e. the estimation of motion vectors between two frames in those areas that are visible in one frame only and are occluded in the other frame.

BACKGROUND OF THE INVENTION

During motion estimation between two frames of a sequence of frames there sometimes is the problem that certain areas of one frame are not visible in the other frame. Typically this is the case for pixels belonging to an object in the background, which in one of the frames are hidden by pixels belonging to a foreground object. In such cases it is not possible to determine a motion vector for the occluded pixels directly from the two frames. Most of today's motion estimators simply assume that the pixels are present in the other frame and provide motion vectors for these pixels, which optimize a selected criterion. However, these motion vectors do generally not correspond to the correct motion vectors.

SUMMARY OF THE INVENTION

It is thus an object of the invention to propose a solution for providing improved motion vectors in case of occlusions.

According to the invention, a method for processing an occlusion in a forward motion field of a second frame relative to a first frame comprises the steps of:
  determining the forward motion field of the second frame relative to the first frame;
  identifying an area in the second frame that is occluded in the first frame; and
  determining a corrected forward motion field by filling the forward motion field in the identified area in the second frame using motion vectors of a previous backward motion field of the second frame relative to a previous third frame.

Accordingly, an apparatus for processing an occlusion in a forward motion field of a second frame relative to a first frame comprises:
  a motion estimator for determining the forward motion field of the second frame relative to the first frame;
  an occlusion identifier for identifying an area in the first frame that is occluded in the second frame; and
  a motion corrector for determining a corrected forward motion field by filling the forward motion field in the identified area in the second frame using motion vectors of a previous backward motion field of the second frame relative to a previous third frame.

The proposed solution considers neighboring motion fields in order to correct the motion field in the areas that are occluded in the other frame. In this way more reliable motion vectors are generated for occluded areas with only limited additional processing cost. The third frame, the second frame, and the first frame, from which the neighboring motion fields are derived, are either temporally successive frames or temporally non-successive frames. In the latter case the relative temporal distances between the frames are taken into account when filling the forward motion field.

Advantageously, the motion estimator further determines a backward motion field of the first frame relative to the second frame, which is preferably stored in a memory. This backward motion field simplifies the detection of occluded areas.

Favorably, a corrected previous backward motion field is determined by filling the previous backward motion field in areas of the second frame that are occluded in the third frame using motion vectors of the forward motion field of the second frame. In case of temporally non-successive frames the relative temporal distances between the frames are taken into account when filling the previous backward motion field. In this way also the earlier backward motion fields are further improved when later motion fields are being processed.

Advantageously, an acceleration between the previous backward motion field and the forward motion field is determined. This acceleration is then taken into account when filling the forward motion field and/or the previous backward motion field. The determination of acceleration ensures that the motion filtering converges faster despite the presence of acceleration.

Preferably, an interpolation filter is applied to the filled motion vectors, e.g. a bilateral filter. This post-processing of the filled motion field reduces noise in the motion map and ensures that the filled motion field is more homogeneous.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERED EMBODIMENTS

Figure 1:
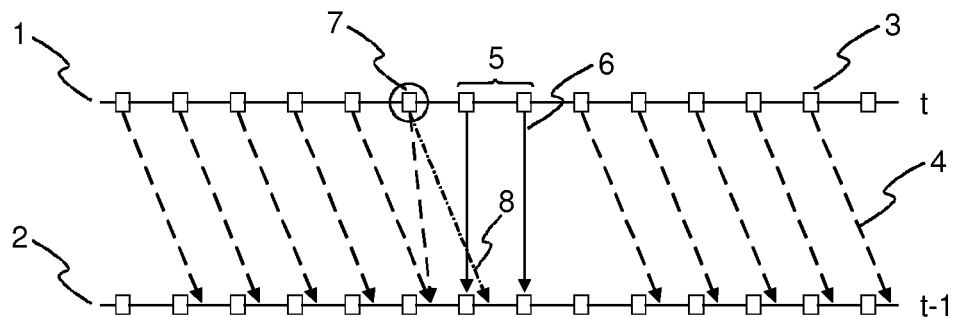
FIG. 1 illustrates a backward motion field of a frame t and the situation of an occlusion in motion estimation.

FIG. 1 illustrates the situation of an occlusion in motion estimation in a motion vector field of a frame t with regard to a previous frame t−1. A particular line 1 of frame t and the corresponding line 2 of frame t−1 are depicted. Each line 1, 2 is any 1D curve selected in the frame. Therefore, for illustration a 1D representation of the frames is sufficient. The pixels are indicated by the small rectangles 3 arranged on the lines 1, 2. The dashed arrows 4 between the frames t and t−1 correspond to the motion vectors. The two pixels 5 with thick continuous arrows 6 are supposed to belong to a foreground object, the remaining pixels belong to the background. In the example of FIG. 1 a problem occurs for the pixel 7 highlighted by the black circle, which is located in the background. The point in frame t−1 corresponding to this pixel is hidden by the foreground object. Actually, the correct motion vector corresponds to the thin dashed-dotted vector 8. Most of the estimators assume that the pixel 7 is present in the other frame and provide a vector for this pixel, which optimizes a given criterion, but does not correspond to the correct motion vector.

Figure 2:
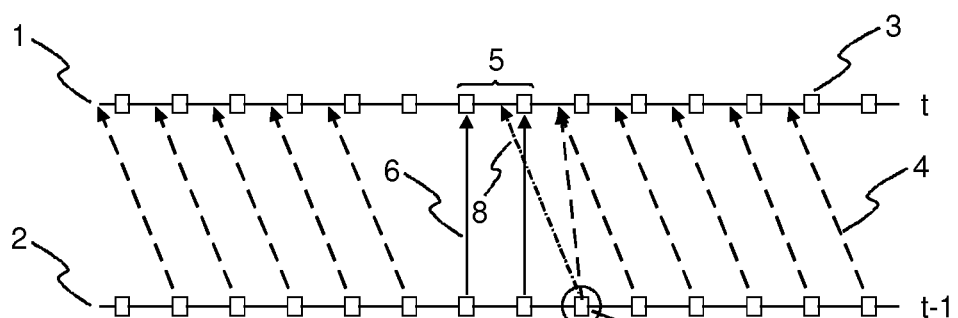
FIG. 2 depicts a forward motion field of a frame t−1.
Figure 3:
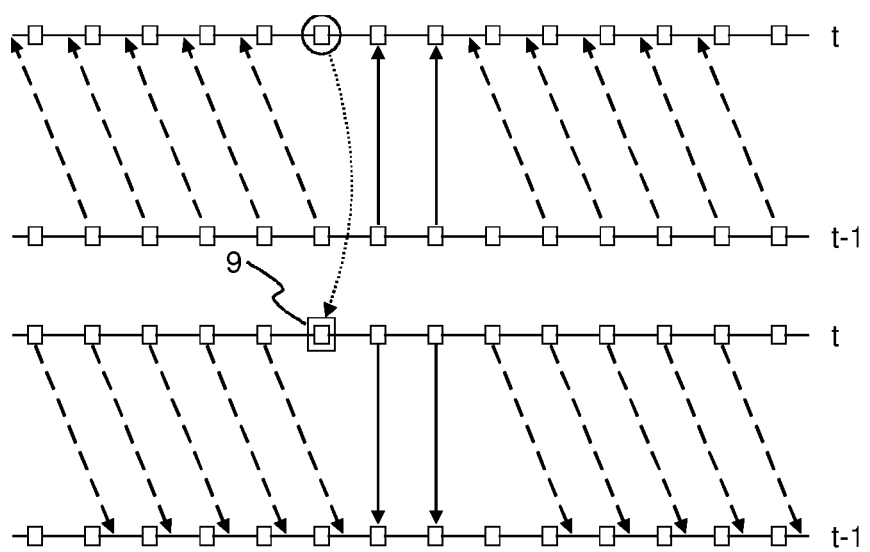
FIG. 3 shows identification and labeling of occluded pixels in frame t.

In order to be able to address occlusions, apparently the areas in the current frame that are occluded in the other frame need to be identified. A known method to identify such areas is to perform a double motion estimation, i.e. to estimate motion twice, between frames t and t−1. This results in a backward motion field for frame t, as in FIG. 1, and a forward motion field for frame t−1, as illustrated in FIG. 2. Starting from the forward motion field for frame t−1 the end points of each vector in frame t corresponding to each pixel are identified. Then the pixels closest to these end points in frame t are identified and marked as having a corresponding pixel in frame t−1. In the same way, starting from the backward motion field for frame t, the end points of each vector in frame t−1 corresponding to each pixel are identified. Then the pixels closest to these end points in frame t−1 are identified and marked as having a corresponding pixel in frame t. At the end of this process, the pixels that did not get a vector are labeled as areas occluded in the other frame and the attached vectors are removed, i.e. considered as false vectors. The identification and labeling of occluded pixels is schematically illustrated in FIG. 3 for frame t and FIG. 4 for frame t−1, where the labeled pixels are indicated by a rectangle 9. For better visibility, the remaining reference numerals introduced in FIGS. 1 and 2 are not shown in these and the following figures.

Figure 4:
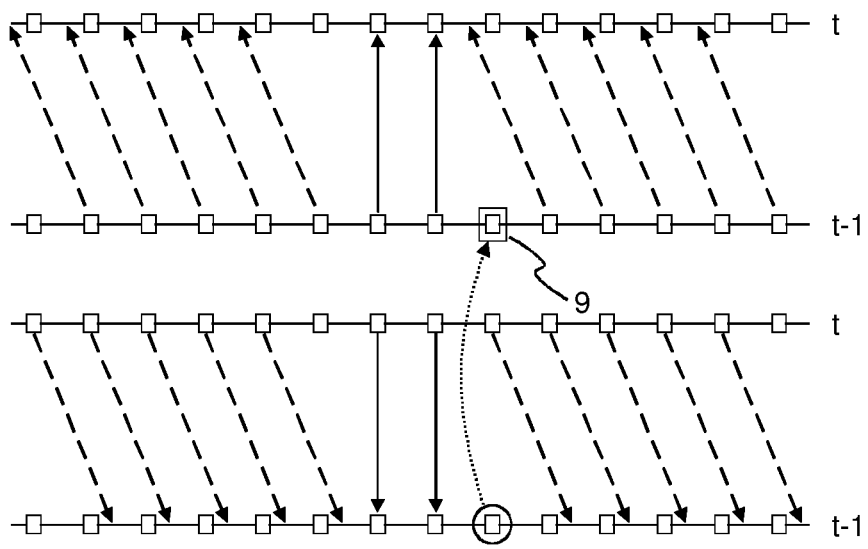
FIG. 4 shows identification and labeling of occluded pixels in frame t−1.
Figure 5:
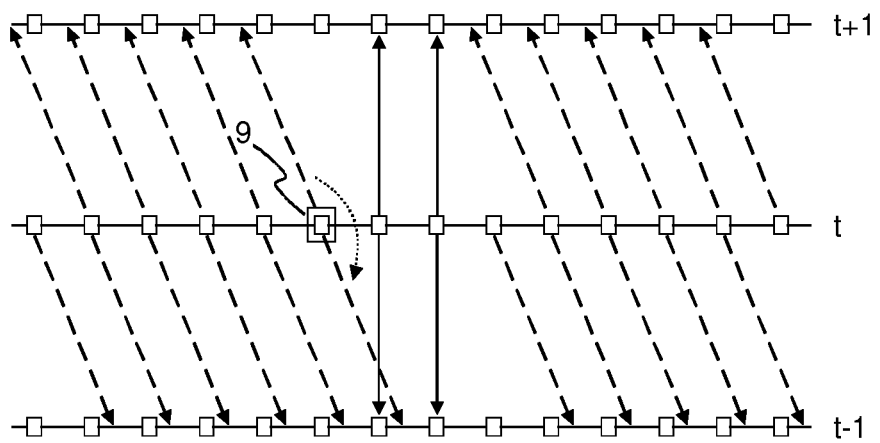
FIG. 5 depicts forward and backward motion fields of frame t.

In order to correct the motion field in the areas that are occluded in the other frame, other neighboring motion fields are considered. In FIGS. 3 and 4 the estimation of motion between the frames t and t−1 has been considered, with the backward motion field t/t−1 and the forward motion field t−1/t. In addition to these motion fields, now two further motion fields are considered. The first further motion field is the forward motion field at frame t that describes the vectors of the pixels in frame t with regard to the pixels in frame t+1, i.e. the motion field t/t+1. Pixels in frame t now have a link to the future through the forward map t/t+1 and a link to the past through the backward map t/t−1. This is schematically illustrated in FIG. 5.

Figure 6:
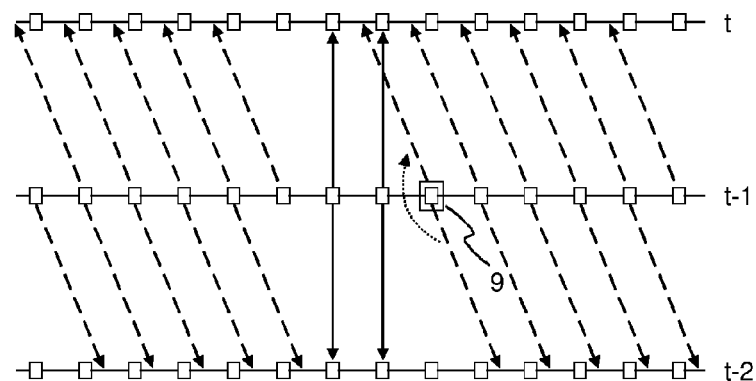
FIG. 6 shows forward and backward motion fields of frame t−1, FIG. 7 schematically illustrates a practical implementation of a sequential motion estimation and correction process.

The second further motion field is the backward motion field at frame t−1 that describes the vectors of the pixels in frame t−1 with regard to the pixels in frame t−2, i.e. the motion field t−1/t−2. Pixels in frame t−1 now have a link to the past through the backward map t−1/t−2 and a link to the future through the forward map t−1/t. This is schematically illustrated in FIG. 6.

The areas in frame t that are occluded in frame t−1 as well as the areas in frame t−1 that are occluded in frame t correspond to holes in the associated motion maps. These holes in frame t are filled by simply assigning to a backward motion vector $d_B^f(p,t)$ of pixel (p,t) the vector opposite to the forward motion vector $d_F(p,t)$. Similarly, the holes in frame t−1 can be filled by simply assigning to the forward motion vector $d_F^f(p,t-1)$ of pixel (p,t−1) the vector opposite to the backward motion vector $d_B(p,t-1)$:

$$d_B^f(p,t) = -d_F(p,t) \tag{1}$$

$$d_F^f(p,t-1) = -d_B(p,t-1) \tag{2}$$

As the filling processing is pixel-based, the resulting filled motion map can be noisy. Therefore, a post-processing of the filled motion field is advantageously applied in order to homogenize the filled motion field, for example via a cross bilateral filtering. The bilateral filter is applied to the filled vectors and is defined by $$d(x) = \frac{\sum_y W_{xy} \times d(y)}{\sum_y W_{xy}} \tag{3}$$

where x is the current pixel, y is a pixel of the N×N window centered on x, and d(y) is the motion vector at pixel y. $W_{xy}$ is the weight assigned to the motion vector of pixel y. $W_{xy}$ is defined as follows:

$$W_{xy} = e^{-\delta^{-1}\Delta_{xy}^2 - \gamma^{-1}\Gamma_{xy}^2 - \beta^{-1}B_{xy}^2} \tag{4}$$

$\Delta_{xy}$ results from the color difference between pixel x and its neighboring pixels y. It is defined as:

$$\Delta_{xy} = \left( \sum_{c \in \{r,g,b\}} |I_c(y) - I_c(x)| \right) \tag{5}$$

$\Gamma_{xy}$ is defined as the distance in the image grid between pixel x and pixel y (Euclidean norm):

$$\Gamma_{xy} = \|x - y\|_2 \tag{6}$$

$B_{xy}$ is defined as the distance between motion values of the pixels x and y:

$$B_{xy} = \|d(x) - d(y)\|_2 \tag{7}$$

The parameters δ, γ, β weight the three costs relative to each other.

Figure 7:
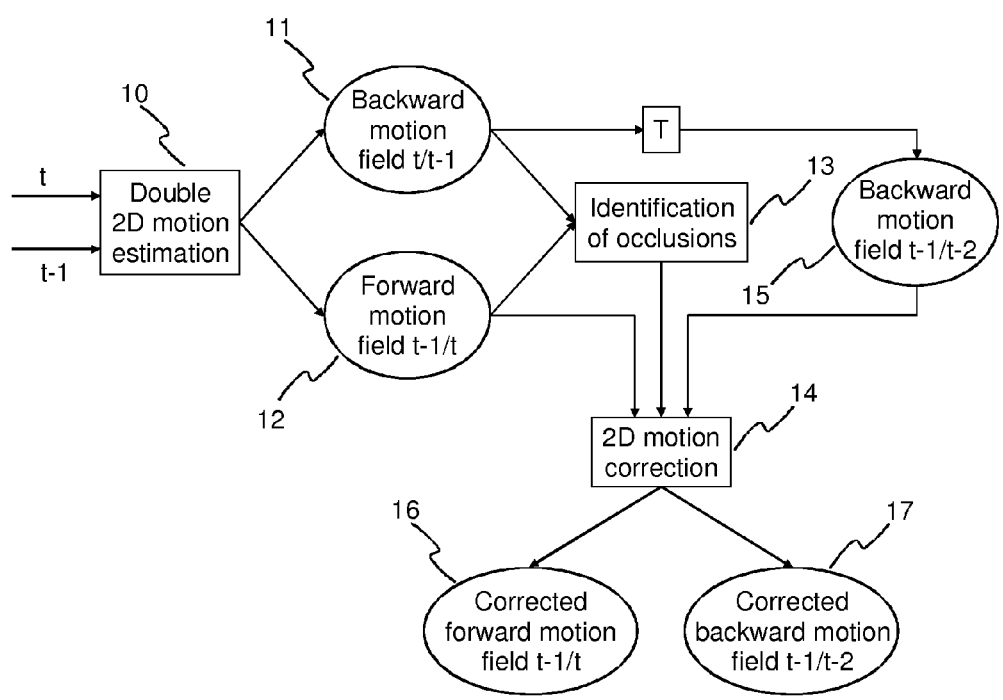
Figure 8:
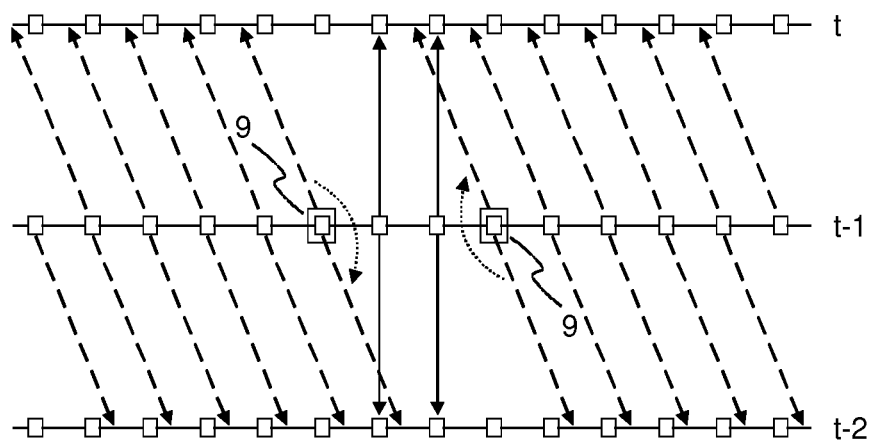
FIG. 8 illustrates the correction of both the forward motion field t−1/t and the backward motion field t−1/t−2.

A practical implementation of the sequential motion estimation and correction process is schematically illustrated in FIG. 7. In a first step 10 a double motion estimation between frames t and t−1 is performed, i.e. a backward motion field t/t−1 11 and a forward motion field t−1/t 12 are determined. In order to correct the current forward motion field t−1/t 12 occlusions are identified 13. Then the areas in frame t−1 that are occluded in frame t are processed 14 based on a previous backward motion field t−1/t−2 15 and an associated occlusion label map, which are obtained from a memory. Also, the previous backward motion field t−1/t−2 15 is corrected 14 by processing the areas in frame t−1 that are occluded in frame t−2 based on the current forward motion field t−1/t 12. The current backward motion field t/t−1 11 and the associated occlusion label maps are available for processing the next pair of motion fields. At the end of the processing at a current time t, the available motion fields are the current backward motion field t/t−1 11, a corrected current forward motion field t−1/t 16, and a corrected previous backward motion field t−1/t−2 17. The motion correction of both the forward motion field t−1/t and the backward motion field t−1/t−2 is illustrated in FIG. 8.

In the presence of acceleration, which for three successive frames t, t−1 and t−2 is defined as the difference between the forward motion field t−1/t and the backward motion field t−1/t−2, an acceleration vector is preferably estimated before motion filling via a second bilateral filtering in order to make the motion filtering converge faster:

$$a(x) = \frac{\sum_y W_{xy} \times a(y)}{\sum_y W_{xy}} \tag{8}$$

Apart from bilateral filtering any 2D+t interpolation filter, which fulfills the following requirements, can be used. The filter needs to take forward vectors t−1/t and backward vectors t−1/t−2 to fill the holes either in the forward map or backward map. Furthermore, the interpolation filter must consider the spatial neighborhood to take into account the spatial variation of the motion and the neighborhood in the facing map in order to cope with acceleration. In addition, the filter should discard the data of the occluding object.

As discussed above, both the forward motion field and the backward motion field for frame t−1 shall be improved. The acceleration can be computed based on the pixels of frame t−1 that are visible in the three frames t−2, t−1 and t. The acceleration vector a( ) is defined as follows for the backward motion field t−1/t−2:

$$a_B(y, t-1) = d_B(y, t-1) + d_F(y, t-1) \tag{9}$$

For the forward motion field t−1/t, the acceleration vector a( ) is defined as:

$$a_F(y, t-1) = d_F(y, t-1) + d_B(y, t-1) \tag{10}$$

The bilateral filtering is used to estimate acceleration in the areas in frame t−1 that are occluded in the other frame. The acceleration is not known for these areas, and hence needs to be derived from the neighboring pixels for which acceleration can be computed. Thus, the bilateral filter allows to estimate an acceleration vector for the occluded areas from the neighboring visible areas.

The weights $W_{xy}$ are adapted to the current pixel, they are defined to give more importance to the acceleration values corresponding to pixels with similar color and similar motion with regard to the current occluded pixel. Therefore, the weights $W_{xy}$ can be the same ones as defined above in equation (4).

The filling process is then realized as follows:

$$d_B^f(p, t) = -d_F(p, t) + a_B(p, t) \tag{11}$$

$$d_F^f(p, t-1) = -d_B(p, t-1) + a_F(p, t-1) \tag{12}$$

Figure 9:
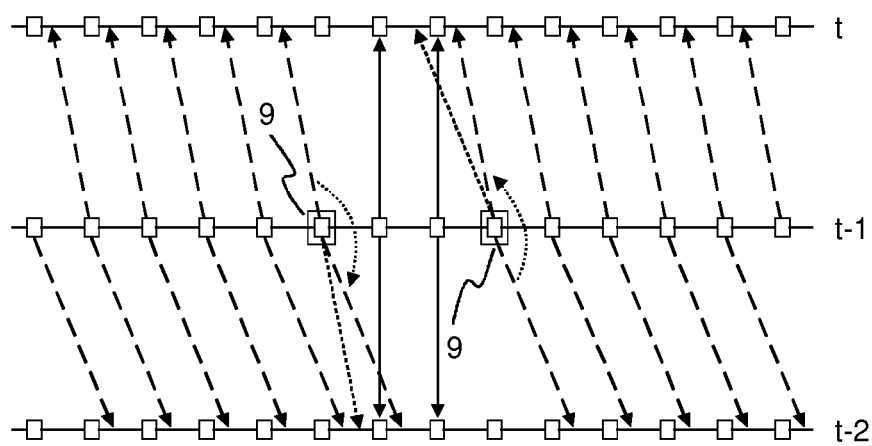
FIG. 9 shows the correction of both the forward motion field t−1/t and the backward motion field t−1/t−2 in presence of acceleration, and invention that implements the correction of motion fields.

This is schematically illustrated in FIG. 9, where the short-dashed arrows designate the filling motion vectors that would result from equations (1) and (2), i.e. without consideration of acceleration.

As before, the filled motion field is advantageously filtered in the filled areas via bilateral filtering.

Up to now triplets of successive frames have been considered, assuming that the time distance between two successive frames is constant. The above processing can be applied to any triplets of frames if the distance between the frames is taken into account. If three frames t−i, t, and t+j are considered, the transfer of motion vectors (filling process) between forward and backward fields, for example $d_B^f(p,t) = -d_F(p,t)$ for the triplet (t−1,t,t+1), becomes:

$$d_B^f(p, t) = -\frac{i}{j} d_F(p, t) \tag{13}$$

where the relative distance of the reference frames t−i and t+j to the current frame t is taken into account.

Furthermore, if distant frames are considered, acceleration will be more frequent and it will be required for accuracy. In this context, acceleration is defined as follows for the backward motion field t/t−I with regard to the forward motion field t/t+j:

$$a_B(y, t) = d_B(y, t) + \frac{i}{j} d_F(y, t) \tag{14}$$

The filling process is then:

$$d_B^f(p, t) = -\frac{i}{j} d_F(p, t) + a_B(p, t) \tag{15}$$

Figure 10:
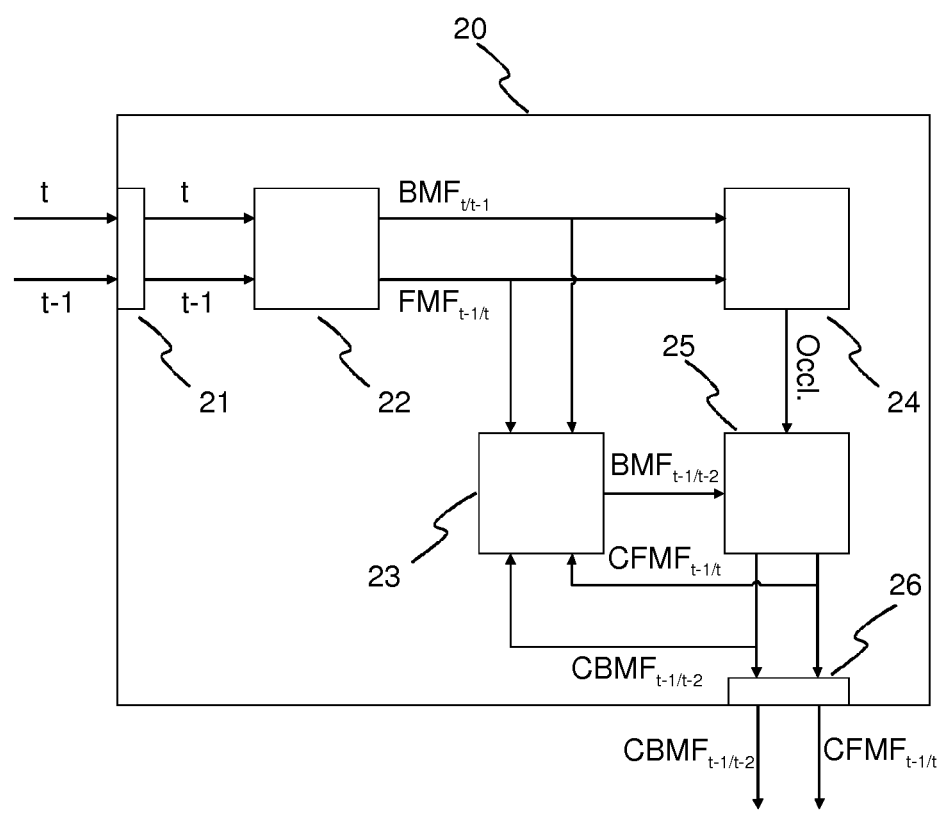

FIG. 10 schematically depicts an apparatus 20 according to the invention that implements the correction of motion fields. The apparatus 20 has an input 21 for receiving a frame t−1 and a frame t. A double 2D motion estimator 22 determines a backward motion field $BMF_{t/t-1}$ and a forward motion field $FMF_{t-1/t}$, which are stored in a memory 23 and send to an occlusion identifier 24. A 2D motion corrector 25 retrieves a previous backward motion field $BMF_{t-1/t-2}$ from the memory 23 and determines a corrected forward motion field $CFMF_{t-1/t}$ and a corrected previous backward motion field $CBMF_{t-1/t-2}$ using the identified occlusions. The two corrected motion fields $CFMF_{t-1/t}$ and $CBMF_{t-1/t-2}$ are stored in the memory 23 and made available for further processing via an output 26.

What is claimed, is:

1. A method for processing an occlusion in a forward motion field of a second frame relative to a first frame, the method comprising:
    determining the forward motion field of the second frame relative to the first frame;
    identifying an area in the second frame that is occluded in the first frame;
    determining a corrected forward motion field of the second frame relative to the first frame by filling the forward motion field in the identified area in the second frame using motion vectors of a previous backward motion field of the second frame relative to a previous third frame; and
    applying a filter to the filled motion vectors, the filter being configured to consider a spatial neighborhood of a first map to account for spatial variation of the motion fields and a spatial neighborhood in a facing map, and to discard data of the occlusion to cope with acceleration.

2. The method according to claim 1, further comprising:
    determining a backward motion field of the first frame relative to the second frame; and
    storing the determined backward motion field in a memory.

3. The method according to claim 1, further comprising determining a corrected previous backward motion field by filling the previous backward motion field in areas of the second frame that are occluded in the third frame using motion vectors of the forward motion field of the second frame.

4. The method according to claim 1, further comprising:
 determining an acceleration between the previous backward motion field and the forward motion field; and
 taking the determined acceleration into account when filling the forward motion field or the previous backward motion field.

5. The method according to claim 1, wherein the filter is an interpolation filter.

6. The method according to claim 5, wherein the interpolation filter is a bilateral filter.

7. The method according to claim 1, wherein the third frame, the second frame, and the first frame are temporally successive frames.

8. The method according to claim 3, wherein the third frame, the second frame, and the first frame are temporally non-successive frames, and wherein the relative temporal distances between the frames are taken into account when filling the forward motion field or the previous backward motion field.

9. An apparatus for processing an occlusion in a forward motion field of a second frame relative to a first frame, the apparatus comprising:
 a motion estimator configured to determine the forward motion field of the second frame relative to the first frame;
 an occlusion identifier configured to identify an area in the first frame that is occluded in the second frame;
 a motion corrector configured to determine a corrected forward motion field of the second frame relative to the first frame by filling the forward motion field in the identified area in the second frame using motion vectors of a previous backward motion field of the second frame relative to a previous third frame; and
 a filter configured to filter the filled motion vectors, the filter being further configured to consider a spatial neighborhood of a first map to account for spatial variation of the motion fields and a spatial neighborhood in a facing map, and to discard data of the occlusion to cope with acceleration.

10. The apparatus according to claim 9, wherein the motion estimator is further configured to determine a backward motion field of the first frame relative to the second frame.

11. The apparatus according to claim 9, further comprising a memory configured to store the determined backward motion field.

12. The apparatus according to claim 9, wherein the motion corrector is further configured to determine a corrected previous backward motion field by filling the previous backward motion field in areas of the second frame that are occluded in the third frame using motion vectors of the forward motion field of the second frame.

13. The apparatus according to claim 12, wherein the motion corrector is further configured to determine an acceleration between the previous backward motion field and the forward motion field and to take the determined acceleration into account when filling the forward motion field or the previous backward motion field.

14. The apparatus according to claim 9, wherein the filter is an interpolation filter configured to interpolate the filled motion vectors.

15. The apparatus according to claim 14, wherein the interpolation filter is a bilateral filter.

16. The apparatus according to claim 9, wherein the third frame, the second frame, and the first frame are temporally successive frames.

17. The apparatus according to claim 12, wherein the third frame, the second frame, and the first frame are temporally non-successive frames, and wherein the motion corrector is configured to take the relative temporal distances between the frames into account when filling the forward motion field or the previous backward motion field.

* * * * *